US009553954B1

(12) United States Patent
Akhter et al.

(10) Patent No.: US 9,553,954 B1
(45) Date of Patent: Jan. 24, 2017

(54) METHOD AND APPARATUS UTILIZING PACKET SEGMENT COMPRESSION PARAMETERS FOR COMPRESSION IN A COMMUNICATION SYSTEM

(71) Applicant: Integrated Device Technology, Inc., San Jose, CA (US)

(72) Inventors: Mohammad Shahanshah Akhter, Ottawa (CA); Brian Scott Darnell, Suwanee, GA (US); Steve Lamontagne, Ottawa (CA); Bachir Berkane, Ottawa (CA); Mike Seufert, Ottawa (CA)

(73) Assignee: Integrated Device Technology, Inc., San Jose, CA (US)

( * ) Notice: Subject to any disclaimer, the term of this patent is extended or adjusted under 35 U.S.C. 154(b) by 734 days.

(21) Appl. No.: 14/043,765

(22) Filed: Oct. 1, 2013

(51) Int. Cl.
*H04W 4/00* (2009.01)
*H04L 29/06* (2006.01)

(52) U.S. Cl.
CPC ................... *H04L 69/04* (2013.01)

(58) Field of Classification Search
CPC .. H04L 69/04; H04L 63/0428; H04L 63/0457; H04L 65/607; H04L 65/80; H04L 43/08; H04L 47/365; H04W 28/06; H04W 28/026; H04N 7/26941; H04N 5/85; H04N 9/8042; H04N 21/2365; H04N 21/4347; H03M 7/30
USPC ......... 709/201, 202, 203, 246, 247; 370/328
See application file for complete search history.

(56) References Cited

U.S. PATENT DOCUMENTS

| | | |
|---|---|---|
| 5,999,561 A | 12/1999 | Naden et al. |
| 6,192,259 B1 | 2/2001 | Hayashi |
| 6,226,325 B1 | 5/2001 | Nakamura |
| 6,240,084 B1 | 5/2001 | Oran et al. |
| 6,263,503 B1 | 7/2001 | Margulis |
| 6,449,596 B1 | 9/2002 | Ejima |
| 6,728,778 B1 | 4/2004 | Brennan et al. |
| 6,775,530 B2 | 8/2004 | Severson et al. |
| 6,842,623 B2 | 1/2005 | Koskal |
| 6,903,668 B1 | 6/2005 | Drorr et al. |
| 7,009,533 B1 | 3/2006 | Wegener |

(Continued)

FOREIGN PATENT DOCUMENTS

| | | |
|---|---|---|
| KR | 1020080056360 A | 6/2008 |
| WO | 2005062494 A1 | 7/2005 |

(Continued)

OTHER PUBLICATIONS

OBSAI Open base Station Architecture Initiative BTS System Reference document Ver. 2.0, Apr. 27, 2006, 151 pages.

(Continued)

*Primary Examiner* — Christopher R Crompton
(74) *Attorney, Agent, or Firm* — Glass & Associates; Kenneth Glass; Molly Sauter (57) ABSTRACT

A method and apparatus for compressing data in a communication system by receiving uncompressed packet at a compressor of the communication system, segmenting the packet into a plurality of packet segments, estimating packet segment compression parameters for each of the plurality of packet segments and compressing the packet segments utilizing one or more of the estimated packet segment compression parameters that are estimated and adjusted based upon the signal characteristics of the uncompressed packet and a desired compression ratio.

17 Claims, 9 Drawing Sheets

(56) References Cited

U.S. PATENT DOCUMENTS

| | | |
|---|---|---|
| 7,088,276 B1 | 8/2006 | Wegener |
| 7,142,519 B2 | 11/2006 | Saadeh et al. |
| 7,519,383 B2 | 4/2009 | Olgaard |
| 7,529,215 B2 | 5/2009 | Osterling |
| 7,541,950 B2 | 6/2009 | Wegener |
| 7,564,861 B1 | 7/2009 | Subbiah |
| 7,599,283 B1 | 10/2009 | Varnier et al. |
| 7,623,894 B2 | 11/2009 | Vaglica et al. |
| 7,656,897 B2 | 2/2010 | Liu |
| 7,680,149 B2 | 3/2010 | Liu et al. |
| 7,706,477 B2 | 4/2010 | Larsson |
| 7,835,435 B2 | 11/2010 | Soni et al. |
| 7,852,797 B2 | 12/2010 | Kang et al. |
| 7,899,410 B2 | 3/2011 | Rakshani et al. |
| 7,924,949 B2 | 4/2011 | Larsson |
| 7,930,436 B1 | 4/2011 | Znosko |
| 7,961,807 B2 | 6/2011 | Kotecha et al. |
| 8,005,152 B2 | 8/2011 | Wegener |
| 8,018,910 B2 | 9/2011 | Jiang et al. |
| 8,054,889 B2 | 11/2011 | Isu et al. |
| 8,089,854 B2 | 1/2012 | Persico |
| 8,108,910 B2 | 1/2012 | Conner, II et al. |
| 8,165,100 B2 | 4/2012 | Sabat et al. |
| 8,174,428 B2 | 5/2012 | Wegener |
| 8,176,524 B2 | 5/2012 | Singh et al. |
| 8,239,912 B2 | 8/2012 | Deng |
| 8,320,433 B2 | 11/2012 | Wegener et al. |
| 8,331,461 B2 | 12/2012 | Wegener et al. |
| 8,340,021 B2 | 12/2012 | Okeeffe et al. |
| 8,649,388 B2 | 2/2014 | Wegener et al. |
| 8,705,634 B2 | 4/2014 | Wegener |
| 8,825,900 B1 | 9/2014 | Gross, IV et al. |
| 8,989,088 B2 | 3/2015 | Ling |
| 9,026,752 B1 * | 5/2015 | Botelho ............... G06F 11/1456 711/162 |
| 9,047,669 B1 | 6/2015 | Ostiguy |
| 9,055,472 B2 | 6/2015 | Evans et al. |
| 9,059,778 B2 | 6/2015 | Ling |
| 9,203,933 B1 | 12/2015 | Akhter et al. |
| 9,215,296 B1 | 12/2015 | Akhter et al. |
| 9,240,803 B2 | 1/2016 | Wegener |
| 2002/0055371 A1 | 5/2002 | Amon et al. |
| 2002/0136296 A1 | 9/2002 | Stone |
| 2002/0163965 A1 | 11/2002 | Lee et al. |
| 2003/0100286 A1 | 5/2003 | Severson et al. |
| 2003/0215105 A1 | 11/2003 | Sacha |
| 2004/0004943 A1 | 1/2004 | Kim |
| 2004/0062392 A1 | 4/2004 | Morton |
| 2004/0082365 A1 | 4/2004 | Sabach et al. |
| 2004/0198237 A1 | 10/2004 | Abutaleb et al. |
| 2004/0218826 A1 | 11/2004 | Terao |
| 2005/0104753 A1 | 5/2005 | Dror et al. |
| 2005/0105552 A1 | 5/2005 | Osterling |
| 2005/0134907 A1 | 6/2005 | Obuchi et al. |
| 2005/0169411 A1 | 8/2005 | Kroeger |
| 2006/0159070 A1 | 7/2006 | Deng |
| 2006/0233446 A1 | 10/2006 | Saito et al. |
| 2007/0054621 A1 | 3/2007 | Larsson |
| 2007/0070919 A1 | 3/2007 | Tanaka et al. |
| 2007/0076783 A1 | 4/2007 | Dishman et al. |
| 2007/0116046 A1 | 5/2007 | Liu et al. |
| 2007/0149135 A1 | 6/2007 | Larsson et al. |
| 2007/0160012 A1 | 7/2007 | Liu |
| 2007/0171866 A1 | 7/2007 | Merz et al. |
| 2007/0293180 A1 | 12/2007 | Rahman et al. |
| 2008/0018502 A1 | 1/2008 | Wegener |
| 2008/0022026 A1 | 1/2008 | Yang et al. |
| 2008/0025298 A1 | 1/2008 | Lev-Ran |
| 2008/0267217 A1 * | 10/2008 | Colville ............... H04L 47/10 370/477 |
| 2009/0092117 A1 | 4/2009 | Jiang et al. |
| 2009/0149221 A1 | 6/2009 | Liu et al. |
| 2009/0265744 A1 | 10/2009 | Singh et al. |
| 2009/0290632 A1 | 11/2009 | Wegener |
| 2010/0067366 A1 | 3/2010 | Nicoli |
| 2010/0177690 A1 | 7/2010 | O'Keeffe et al. |
| 2010/0202311 A1 | 8/2010 | Lunttila et al. |
| 2010/0246642 A1 | 9/2010 | Walton et al. |
| 2010/0285756 A1 | 11/2010 | Nakazawa |
| 2011/0235500 A1 * | 9/2011 | Shenoi ............... H04J 3/0632 370/201 |
| 2011/0280209 A1 | 11/2011 | Wegener |
| 2012/0008696 A1 | 1/2012 | Wegener |
| 2012/0014421 A1 | 1/2012 | Wegener |
| 2012/0014422 A1 | 1/2012 | Wegener |
| 2012/0057572 A1 | 3/2012 | Evans |
| 2012/0183023 A1 | 7/2012 | Filipovic et al. |
| 2012/0202507 A1 | 8/2012 | Zhang et al. |
| 2012/0207206 A1 | 8/2012 | Samardzija et al. |
| 2012/0250740 A1 | 10/2012 | Ling |
| 2012/0307842 A1 | 12/2012 | Petrov et al. |
| 2012/0327956 A1 | 12/2012 | Vasudevan |
| 2012/0328121 A1 | 12/2012 | Truman et al. |
| 2014/0208069 A1 | 7/2014 | Wegener |
| 2015/0003539 A1 * | 1/2015 | Umezaki ............... H04N 19/61 375/240.28 |
| 2015/0092881 A1 | 4/2015 | Hwang et al. |

FOREIGN PATENT DOCUMENTS

| | | |
|---|---|---|
| WO | 2008152455 A1 | 12/2008 |
| WO | 2009143176 A2 | 11/2009 |
| WO | 2009/151893 | 12/2009 |
| WO | 2011/135013 | 11/2011 |

OTHER PUBLICATIONS

OBSAI Open Base Station Architecture Initiative Reference Point 3 Specification Ver. 4.0, Mar. 7, 2007, 119 pages.

K. I. Pendersen. "Frequency domain scheduling for OFMA with limited and noisy channel feedback" 2007 IEEE 66th Vehicular Technology Conference. pp. 1792-1796, Oct. 3, 2007., see section II. C.

Maruyama, S. et al., "Base Transceiver Station for W-CDMA System," Fujitsu Sci. Tech. J. 38,2, p. 167-73, Dec. 2002.

"CPRI Specification V3.0 Common Public Radio Interface (CPRI)", Interface Specification. Ericsson Ab, huawei Technologies Col ltd, NEC Corporation, Nortel Networks SA and Siemens Networks BmbH & Co., Oct. 2, 2006, 89 Pages.

* cited by examiner

Fig. 9 under # US 9,553,954 B1

METHOD AND APPARATUS UTILIZING PACKET SEGMENT COMPRESSION PARAMETERS FOR COMPRESSION IN A COMMUNICATION SYSTEM

BACKGROUND OF THE INVENTION

Transceiver systems in wireless communication networks perform the control functions for directing signals among communicating subscribers, or terminals, as well as communication with external networks. Transceiver systems in wireless communications networks include radio base stations and distributed antenna systems (DAS). For the reverse link, or uplink, a terminal transmits the RF signal received by the transceiver system. For the forward link, or downlink, the transceiver system transmits the RF signal to a subscriber, or terminal, in the wireless network. A terminal may be fixed or mobile wireless user equipment unit (UE) and may be a wireless device, cellular phone, personal digital assistant (PDA), personal computer or other device equipped with a wireless modem.

The rapid increase in data (e.g., video) communication and content consumption has led to expansion of wireless communication networks. As a result, the introduction of next generation communication standards (e.g., 3GPP LTE-A, IEEE 802.16m) has led to improved techniques for data processing, such as carrier aggregation (e.g., 100 MHz) with 8×8 MIMO (Multiple-Input, Multiple-Output) and CoMP (Co-Operative Multi-Point). This in turn has created the need for radio access networks capable of handling wider bandwidths and an increasing number of antennas. These radio access networks will require a higher numbers of fiber links to connect the base stations to the remote radio units. In addition, it is desirable to provide carrier aggregation with Multiple-Input and Multiple-Output (MIMO) and Co-Operative Multipoint (CoMP) techniques to significantly increase spectral efficiency. The implementation of Co-Operative Multipoint techniques requires communication between the baseband units and requires an increasing number of optical or wireless links between the baseband units and the radio units to support the increased data rate achievable with these improved transmission schemes. The increasing number of links required for these techniques results in an undesirable increased infrastructure cost.

Compression techniques can be used to reduce the infrastructure cost by reducing the number of optical or wireless links required to transmit the data as well as by optimizing resources. Compression techniques require the estimation of real-time compression parameters be applied during the compression of the data in order to achieve a target compression ratio. At any point in time, the deviation of the average achieved compression ratio from a user programmable target compression ratio must be bounded within an acceptable margin, while still maintaining an acceptable low-level of data degradation.

Utilizing the compression techniques currently known in the art, it is difficult to achieve an average compression ratio with reasonable signal degradation while also keeping the latency jitter low. Compression techniques known in the art are unable to meet a user programmable compression target while still maintaining a low-level of data degradation and an acceptable peak compression jitter with respect to the user programmable target compression ratio.

Accordingly, there is a need for a method and apparatus for data compression that adapts to the continually changing, and often unpredictable, behavior of the received data signal resulting from the aggregation of multiple carriers and channels, thereby providing a compressed data signal having a reasonable level of latency jitter and an acceptable level of performance degradation.

SUMMARY OF THE INVENTION

The present invention provides a method and apparatus that will allow for the significantly higher data rate necessary for the implementation of carrier aggregation with MIMO and co-operative multipoint (CoMP) in next generation communication standards, such as 3GPP, LTE-A and IEEE 802.16m. With the present invention, the data rate is reduced utilizing a novel compression scheme based upon the division of packets into packet segments and the estimation of compression parameters based upon the signal characteristics of each individual packet segment. The system and method of the present invention will reduce bandwidth and maintain low latency jitter while attaining a target compression ratio.

In operation, a method for compressing data in a communication system includes, receiving an uncompressed packet at a compressor of a communication system, the uncompressed data packet comprising a plurality of signal samples and identifying a desired compression ratio for the uncompressed packet. The uncompressed packet is then segmented into a plurality of packet segments, each of the plurality of packet segments comprising one or more signal samples and segment compression parameters are estimated for each of the plurality of packet segments based upon the desired compression ratio. The packet segments are then compressed using each of the at least one estimated segment compression parameter estimated for the packet segment to generate a compressed packet the at least one estimated segment compression parameter are embedded into the compressed packet prior to transmission of the compressed packet over a communication link.

The packet segment compression parameters may be estimated for the packet segment by processing each of the plurality of packet segments through a plurality of compression parameter estimation paths operating in parallel and identifying the compression parameter estimation path of the plurality of compression parameter estimation paths that most closely meets a desired compression result.

The number of signal samples in each of the plurality packet segments may be fixed and equal. Alternatively, the number of signal samples in each of the plurality of packet segments may be variable and unequal.

The at least one packet segment compression parameter may be, but is not intended to be limited to, a level of data degradation, a redundancy method and an encoding value scheme.

A compressor is provided in accordance with the present invention, the compressor including a data segmentation module configured to receive an uncompressed packet and configured to segment the uncompressed packet into a plurality of packet segments, each of the plurality of packet segments comprising one or more signal samples. The compressor further including a packet segment compression parameter estimation module coupled to the data segmentation module, the packet segment compression parameter estimation module configured to receive the plurality of packet segments and configured to estimate at least one segment compression parameter for each of the plurality of packet segments based upon a desired compression ratio. The compressor further including a compression processing module coupled to the packet segment compression parameter estimation module, the compression processing module configured to compress each of the plurality of packet segments using the at least one estimated segment compression parameter estimated for the packet segment to generate a compressed packet and configured to embed the at least one estimated segment compression parameter into the compressed packet.

The packet segment compression parameter estimation module may further include a plurality of compression parameter estimation paths operating in parallel on the plurality of packet segments and an analysis and decision module coupled to each of the plurality of compression parameter estimation paths, the analysis and decision module configured to identify the compression parameter estimation path of the plurality of compression estimation paths that most closely meets a desired performance level to estimate the at least one compression parameter.

A compression system for compression and decompression in accordance with the present invention includes a compressor and a decompressor. The compressor includes a data segmentation module configured to receive an uncompressed packet and configured to segment the uncompressed packet into a plurality of packet segments, each of the plurality of packet segments comprising one or more signal samples. A packet segment compression parameter estimation module is configured to receive the plurality of packet segments and configured to estimate at least one segment compression parameter for each of the plurality of packet segments based upon a desired compression ratio. A compression processing module is configured to compress each of the plurality of packet segments using the at least one estimated segment compression parameter estimated for the packet segment to generate a compressed packet and configured to embed the at least one estimated segment compression parameter into the compressed packet. The decompressor includes a packet segmentation compression parameter parsing module to recover the packet segment compression parameters from the compressed packet. A decompression processing module is configured to reconstruct the uncompressed packet.

DESCRIPTION OF THE INVENTION

The modular design approach for radio transceiver systems, wherein the baseband processing is separated from the radio frequency processing, has led the industry to develop interface standards. One example of a standard interface for the data transfer interfaces between the radio units and baseband units of transceiver systems is the Common Public Radio Interface (CPRI). Connection topologies between the baseband unit and one or more remote radio units include point-to-point, multiple point-to-point, chain, star, tree, ring and combinations thereof. Another example of an interface specification for modular architecture of radio transceiver systems is the Open Base Station Architecture Initiative (OBSAI). The OBSAI specification describes alternative protocols for the interconnection of baseband modules and remote radio units analogous to the CPRI specification, as well as data transfer protocols for the serial data links.

In conventional cellular communication systems, radio coverage is provided for a given geographic area via multiple base stations distributed throughout the geographic area involved. In this way, each base station can serve traffic in a smaller geographic area. Consequently, multiple base stations in a wireless communication network can simultaneously serve users in different geographic areas, which increases the overall capacity of the wireless network involved.

In order to further increase the capacity of wireless systems, each base station may be configured to support radio coverage in multiple sectors. For example, a base station in a conventional cellular system may be configured to provide radio coverage in one sector, three sectors or six sectors. In those systems employing multiple sectors per base station, each sector can handle part of the traffic in an additional smaller geographic area, which increases the overall capacity of the wireless network involved. Each of the sectors may include multiple remote radio units in communication with each of the base stations. Each of the radio units may further include multiple antennas for both receiving and transmitting data between the radio unit and the user of the communication system.

As described, communication systems are known in the art to include a baseband unit for performing signal processing in communication with a remote radio unit for receiving and transmitting signals to an antenna. The present invention provides a method and apparatus for an efficient compression solution implemented in a data compressor of a communication system.

Figure 1:
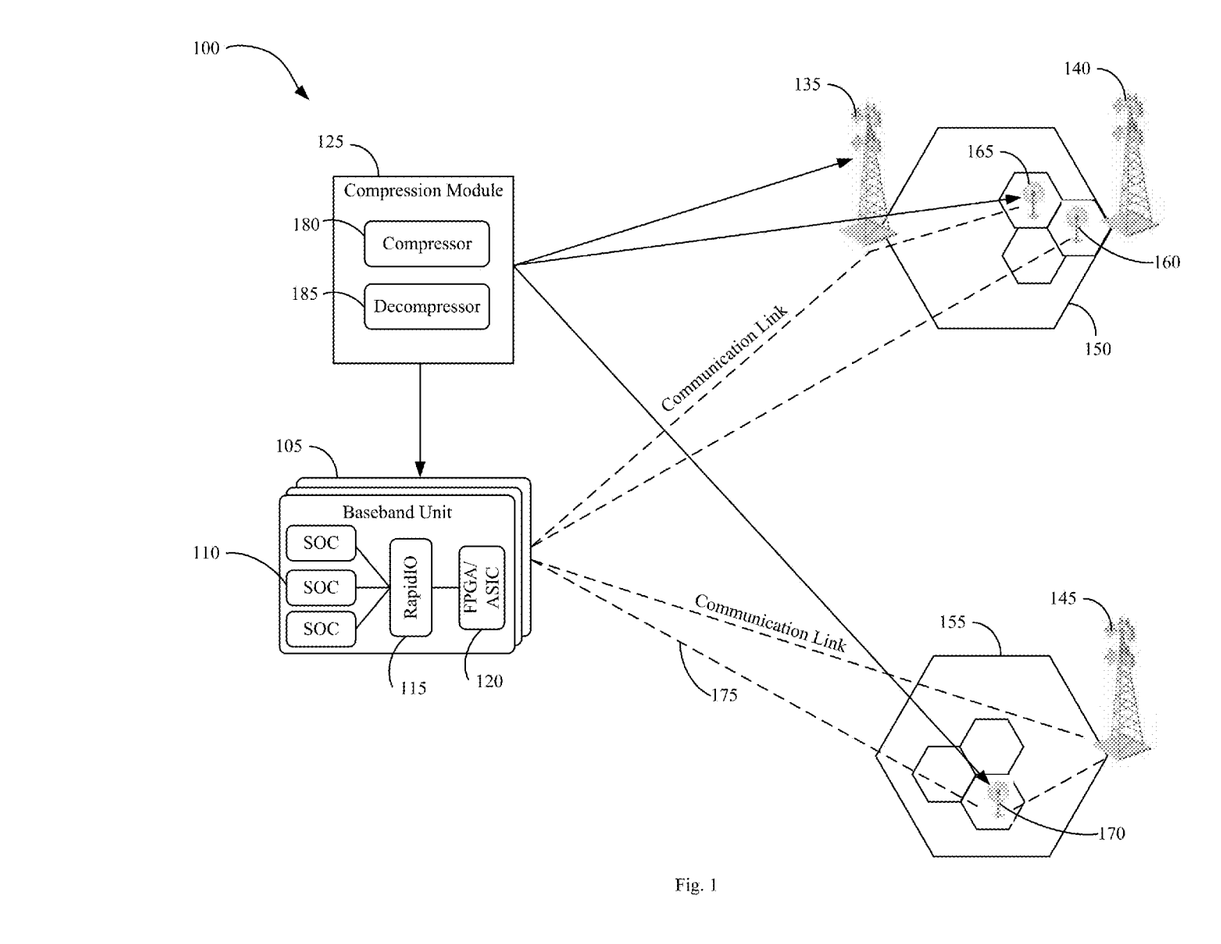
FIG. 1 is an illustration of a communication system architecture in accordance with an embodiment of the present invention.

FIG. 1 illustrates a typical usage of compression and decompression in a radio access network communication system. With reference to FIG. 1, in a centralized radio access network communication system 100, remote radio units 135, 140, 145, 160, 165, 170 may include one or more antennas that may be used to transmit radio frequency data to a user or to receive radio frequency data from a user. Each of the remote radio units is responsible for providing a communication signal within a predetermined coverage area 150, 155. In a particular embodiment, the coverage area may be defined by a macro cell with a small cell overlay. The remote radio units 135, 140, 145, 160, 165, 170 may be coupled to a baseband unit 105 and to each other through a communication link 175. The communication link 175 may be a wireless, wired or optical link. In a particular embodiment, the connection may be a wired CPRI link. The baseband unit 105 may include a plurality of baseband cards and each baseband card may further include a control processor 110 implemented in an SOC (System on a Chip) additional signal processing circuitry 120 implemented in an FPGA or ASIC and a RapidIO interface 115 between the control processor 110 and the signal processing circuitry 120. The control circuit and signal processing circuitry may perform signal processing functions to modulate communication data that were extracted from previously received wireless signals or signals received from an external network to produce digital signals. The signal processing functions depend on the modulation format and can include symbol modulation, channel coding, spreading for CDMA, diversity processing for transmission, time and frequency synchronization, upconverting, multiplexing, and inverse fast Fourier transformation for OFDM. A compression module 125 may be implemented within the baseband unit 105 and/or at one or more of the remote radio units 135, 140, 145, 160, 165, 170. The compression module 125 may include both a compressor 180 and a decompressor 185. The compression module 125 is responsible for compressing the signal samples to be transmitted over the communication link 175 and for decompressing the received signal after transmission over the communication link 175. The compressor 180 and decompressor 185 may be integrated into one circuit, or the compressor 180 and decompressor 185 may be separate circuits.

In a particular embodiment, the signal samples may be compressed at the baseband unit 105 prior to being transmitted to one or more of the remote radio units 135, 140, 145, 160, 165, 170, where the compressed signal samples are then decompressed. Alternatively, the signal samples may also be compressed at the remote radio unit 135, 140, 145, 160, 165, 170, prior to being transmitted to the baseband unit 105, where the compressed signal samples are then decompressed.

In the present invention, the compressor 180 is used to compress the signal samples prior to transmission over the communication link 175 to increase the data throughput of the communication system. Compressing the data prior to transmission over the wireless link also allows for a reduction in the number of antennas that are necessary to transmit the signal samples between the baseband unit 105 and the remote radio units 135, 140, 145, 160, 165, 170.

The radio units 135, 140, 145, 160, 165, 170 may be operating in the same sector or in different sectors. In operation, the radio units 135, 140, 145, 160, 165, 170 may receive data from the baseband unit 105, or from another one of the radio units 135, 140, 145, 160, 165, 170.

In a communication system operating in an uplink mode, radio frequency data is received from a user at an antenna associated with a remote radio unit 135, 140, 145, 160, 165, 170 to be transmitted to a baseband unit 105. The radio frequency data received at the remote radio unit is sampled and converted to digital data and additional data processing may be applied to the data at the radio unit 135, 140, 145, 160, 165, 170. The data is then compressed at the compression module 125 of the radio unit 135, 140, 145, 160, 165, 170 and then transmitted from the radio unit 135, 140, 145, 160, 165, 170 to the baseband unit 105 for further processing.

In a communication system operating in a downlink mode, data may be transmitted from the baseband unit 105 to a remote radio unit 135, 140, 145, 160, 165, 170 for subsequent transfer of the data to a user via an antenna in communication with the remote radio unit 135, 140, 145, 160, 165, 170. The signal samples received at the baseband unit 105 are converted to digital data and additional data processing may be applied to the signal samples at the baseband unit 105. The signal samples are then compressed at the compression module 125 of the baseband unit 105 and then transmitted from the baseband unit 105 to one or more of the remote radio units 135, 140, 145, 160, 165, 170 for further processing.

Figure 2:
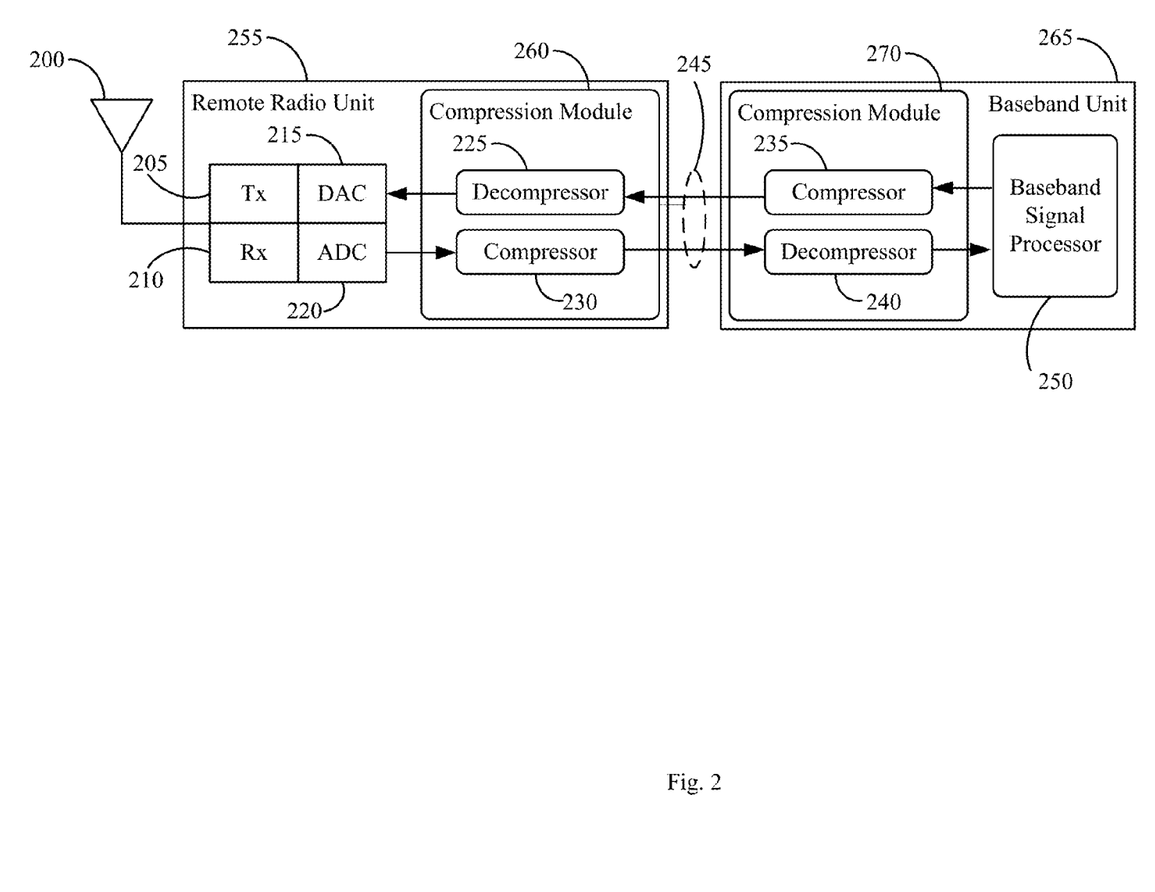
FIG. 2 is a block diagram illustrating a general base station architecture that incorporates compression and decompression in accordance with an embodiment of the present invention.

FIG. 2 is a block diagram illustrating a general communication system architecture that incorporates compression and decompression. With reference to FIG. 2, the communication system architecture includes a baseband unit 265 connected by one or more serial communication links 245 to a remote radio unit 255. This general architecture can be used for any air interface standard employed by wireless communication networks, including GSM/EDGE, CDMA based modulation formats, OFDM base modulation formats such as WiMax and other signal modulation formats that may evolve. The remote radio unit 255 may be located near the antenna 200 on an antenna tower. The remote radio unit 255 may be connected to multiple antennas for transmission, reception, diversity or beamforming. The serial communication link 245 may be implemented by fiber optic, coaxial cable or RJ-45 twisted pair. The baseband unit 265 performs signal processing functions to prepare data for transmission by the remote radio unit 255 or recovers data from signal samples received from the remote radio unit 255. The signal processing functions performed by the baseband unit 254 may include symbol modulation/demodulation, channel coding/decoding, spreading/de-spreading for CDMA, diversity processing for transmission/reception, interference cancellation, equalization, time and frequency synchronization, upconverting/downconverting, multiplexing/demultiplexing and data transport to/from an external network.

For the transmit path, or downlink, the baseband signal processor 250 of the baseband unit 265 performs the signal processing functions to modulate communication data that were extracted from previously received wireless signals or received from an external network to produce digital signals. The signal processing functions depend on the modulation format and can include symbol modulation, channel coding, spreading for CDMA, diversity processing for transmission, time and frequency synchronization, upconverting, multiplexing and inverse discrete Fourier transformation for OFDM. The compressor 235 of the compression module 270 compresses the samples of the digital signal prior to transfer over a communication link 245 to the remote radio unit 255. At the remote radio unit 255, the decompressor 225 of the compression module 260 decompresses the compressed samples to reconstruct the digital signal before digital to analog conversion. The digital to analog converter (DAC) 215 of the remote radio unit 255 converts the reconstructed digital signal to an analog signal. The transmitter (Tx) 205 prepares the analog signal for transmission by the antenna 200, including up-conversion to the appropriate radio frequency, RF filtering and amplification.

For the receive path, or uplink, antenna 200 at the remote radio unit 255 receives an RF analog signal representing modulated communication data from one or more wireless sources, or subscribers. The frequency band of the received signal may be a composite of transmitted signals from multiple wireless subscribers. Depending on the air interface protocol, different subscriber signals can be assigned to certain frequency channels or multiple subscribers can be assigned to a particular frequency band. The receiver (Rx) 210 of the remote radio unit 255 performs analog operations of the RF analog signal, including RF filtering, amplification and down-conversion to shift the center frequency of the received signal. The analog to digital converter (ADC) 220 of the remote radio unit 255 converts the received analog signal to a digital signal to produce signal samples that have only real values, or alternatively, have in phase (I) and quadrature (Q) components, based upon the system design. The compressor 230 of the remote radio unit 255 applies compression to the digital signal samples before transmission over the communication link 245. At the baseband unit 265, the decompressor 240 of the compression module 270 decompresses the compressed samples to reconstruct the digital signal prior to performing the normal signal processing at the baseband signal processor 250 to recover communication data from the decompressed digital signal. The processing operations may include demodulating symbols, channel decoding, dispreading (for CDMA modulation formats), diversity processing, interference cancelling, equalizing, time and frequency synchronization, downconverting, demultiplexing, discrete Fourier transformation (for OFDM modulation formats) and transporting data derived from the decompressed signal samples to an external network.

Figure 3:
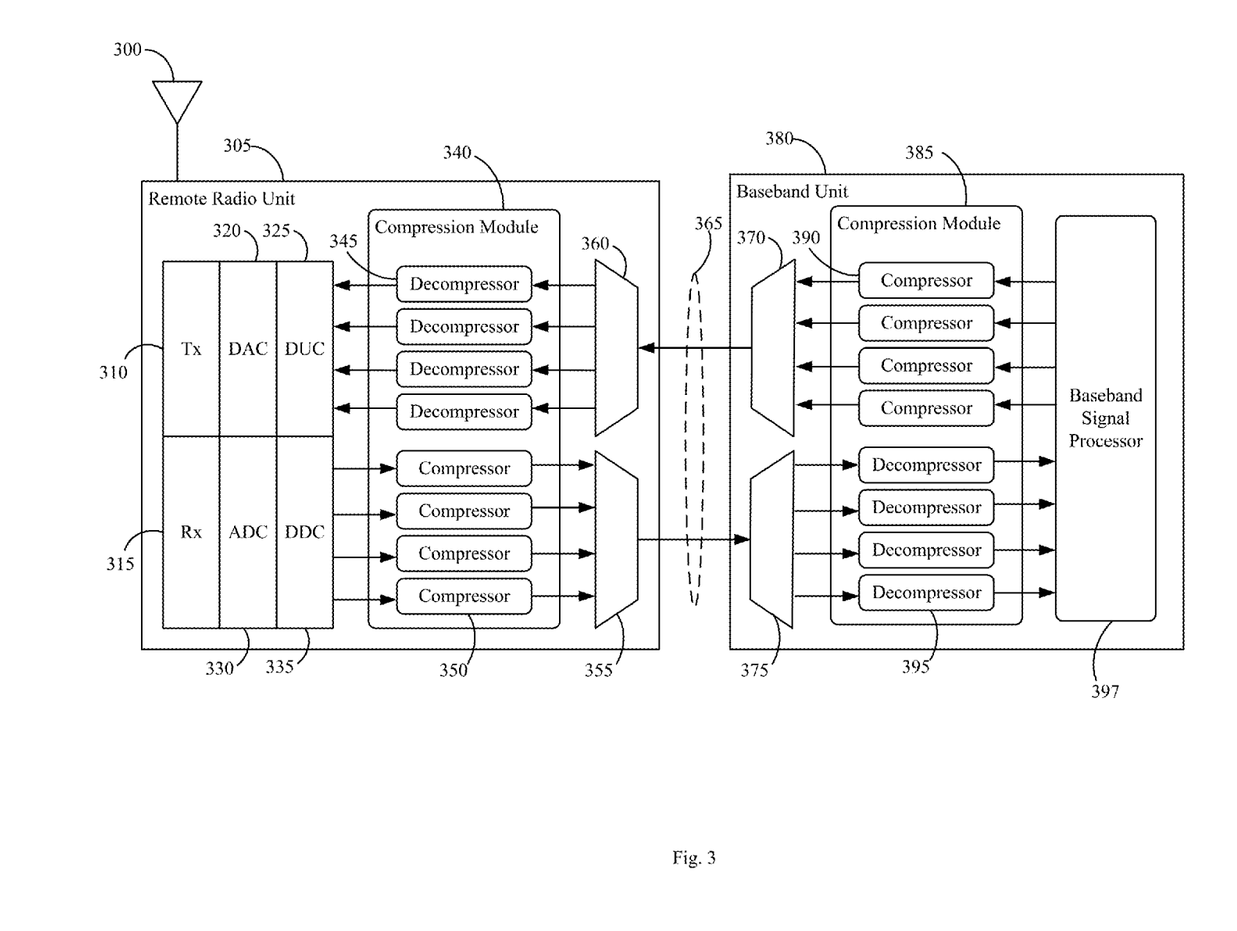
FIG. 3 is a block diagram illustrating compression and decompression where multiple signal channels are compressed and multiplexed before transfer over a communication link in accordance with an embodiment of the present invention.

FIG. 3 is a block diagram of compression and decompression in accordance with the present invention, wherein multiple signal channels are compressed and multiplexed before transfer over a communication serial data link. Both OBSAI and CPRI transceivers may receive and transmit multiple frequency channels of signal samples for each independent antenna, or multiple antenna-carriers. With reference to FIG. 3, there are four channels of signal samples representing four antenna-carriers. The signal samples comprise baseband I and Q samples. For the transmit path, each compressor 390 of the compression module 385 at the baseband unit 380 independently compresses a stream of baseband I,Q signal samples to form corresponding streams of compressed samples. The multiplexer 370 multiplexes the compressed samples into a single serial data stream for transfer over serial data communication link 365 in accordance with the standard. At the remote radio unit 305, the demultiplexer 360 demultiplexes the serial data stream to recover the four streams of compressed samples in accordance with the standard. At the remote radio unit 305, each decompressor 345 of the compression module 340 decompresses one stream of compressed samples to reconstruct the corresponding baseband I,Q signal samples. The digital upconverter (DUC) 325 of the remote radio unit 305 upconverts each stream of decompressed signal samples to respective carrier frequencies to form a channelized signal. Each upconverted digital signal may occupy a particular channel of the resulting channelized signal. The digital to analog converter (DAC) 320 of the remote radio unit 305 converts the channelized signal to an analog signal. The transmitter 310 of the remote radio unit 305 converts the analog signal to the appropriate RF frequency for transmission by the antenna 300.

Additionally, with reference to FIG. 3, for the receive path, the receiver (Rx) 315 of the remote radio unit 305 receives the RF signal and the ADC 330 digitizes the received signal to produce a digital signal that represents a channelized signal data as previously described for the transmit path. The digital down converter (DDC) 335 of the remote radio unit downconverts each channel to form corresponding streams of baseband I,Q signal samples, one for each channel. The compressors 350 of the compression module 340 compress the received signal samples to form compressed samples. The multiplexer 355 multiplexes the streams of compressed samples output from the compressors 350 to form a serial data stream in accordance with the OBSAI or CPRI standards. The serial data stream is transferred via the serial data communication link 365 to the baseband unit 380. The demultiplexer 375 at the baseband unit 380 demultiplexes the serial data to restore the four streams of compressed samples. Each decompressor 395 of the compression module 385 reconstructs the corresponding I,Q signal samples prior to performing normal operations by the baseband signal processor 397.

Figure 4:
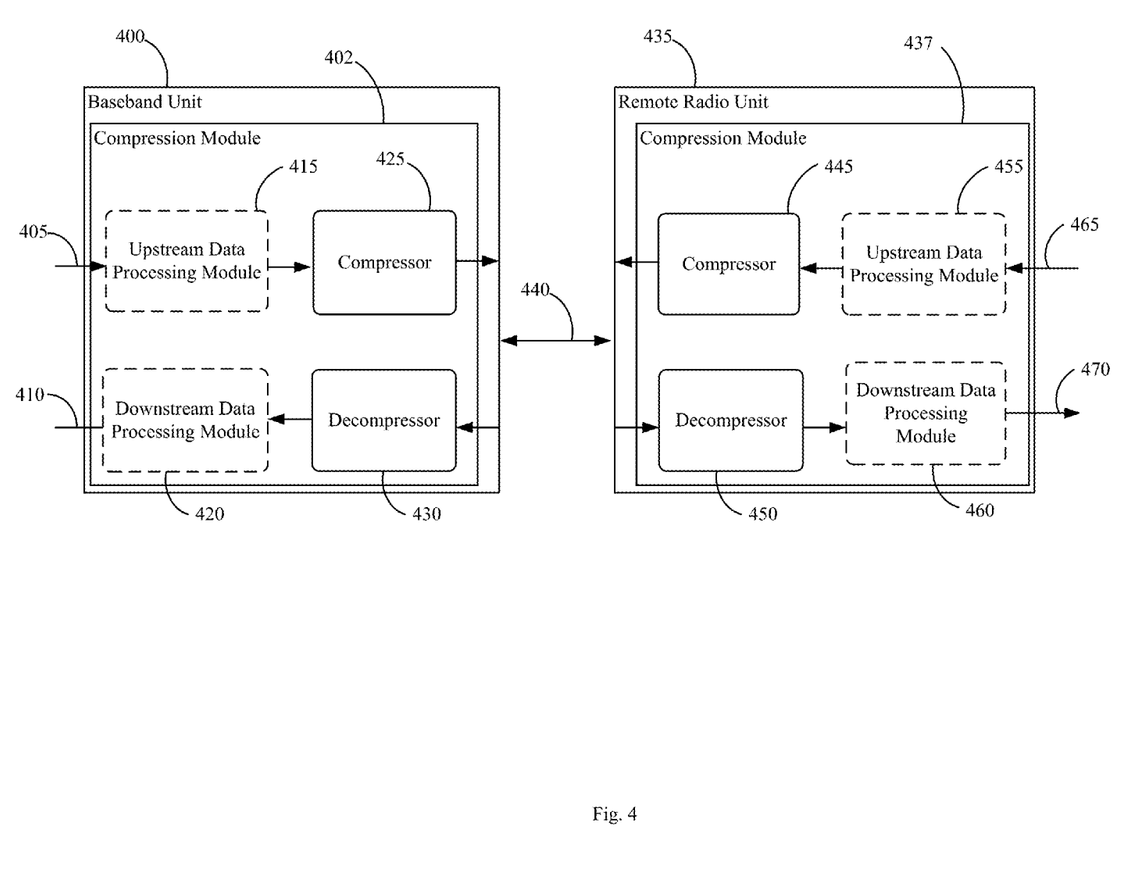
FIG. 4 is a block diagram illustrating a baseband unit and a remote radio unit accordance with the present invention for performing efficient compression and decompression in accordance with an embodiment of the present invention.

With reference to FIG. 4, an exemplary system is shown that includes a compression module 402 that is located at a baseband unit 400 and a compression module 437 that is located at a remote radio unit 435. Communication link 440 connects to the baseband unit 400 and to one or more remote radio unit so as to allow for communication between compression module 402 and compression module 437. Compression modules 402, 437 may be implemented in an ASIC, SOC, FPGA or DSP. Compression module 402 includes a compressor 425 and an upstream data processing module 415 that is coupled to compressor 425. Compression module 402 also includes a decompressor 430 and a downstream data processing module 420 that is coupled to decompressor 430. and a downstream processing module 420.

In an uplink mode of operation, signal samples 405 to be transmitted to one or more of the remote radio units may be provided to the baseband unit 400. The compression module 402 may preprocess the signal data utilizing upstream data processing module 405. The preprocessed data from upstream data processing module 405 may then be transmitted to compressor 425. Compressor 425 compresses the signal data and transmits the compressed signal data over communication link 440 to one or more of the remote radio units. In a downlink mode of operation, compressed signal data may be received at compression module 402 from one or more of the remote radio units over the communication link 440. The compressed signal data may be provided to decompressor 430. The decompressor 430 is then operable to decompress the compressed signal data. The decompressed signal data may then be provided to a downstream data processing module 420 for additional processing prior to transmitting the decompressed signal data 410 from the compression module 402.

Compression module 437 includes a compressor 445 and an upstream data processing module 455 that is coupled to compressor 445. Compression module 437 also includes a decompressor 450 and a downstream data processing module 460 that is coupled to decompressor 450. In an uplink mode of operation, signal data 465 to be transmitted to the baseband unit from one or more of the remote radio units may be received from an end user or subscriber. The compression module 437 may preprocess the signal data utilizing upstream data processing module 455. The preprocessed data from the upstream data processing module 445 is then be transmitted to compressor 445. The compressor 445 compresses the signal data and transmits the compressed signal data to the baseband unit 400 over the communication link 440. In a downlink mode of operation, compressed signal data may be received at the compression module 437 from the baseband unit 400 over communication link 440. The decompressor 450 may then decompress the compressed signal data. After decompression, the decompressed signal data may be provided to downstream data processing module 460 for additional processing prior to transmitting the decompressed signal data 470 from the compression module 437 of the remote radio unit.

Figure 5A:
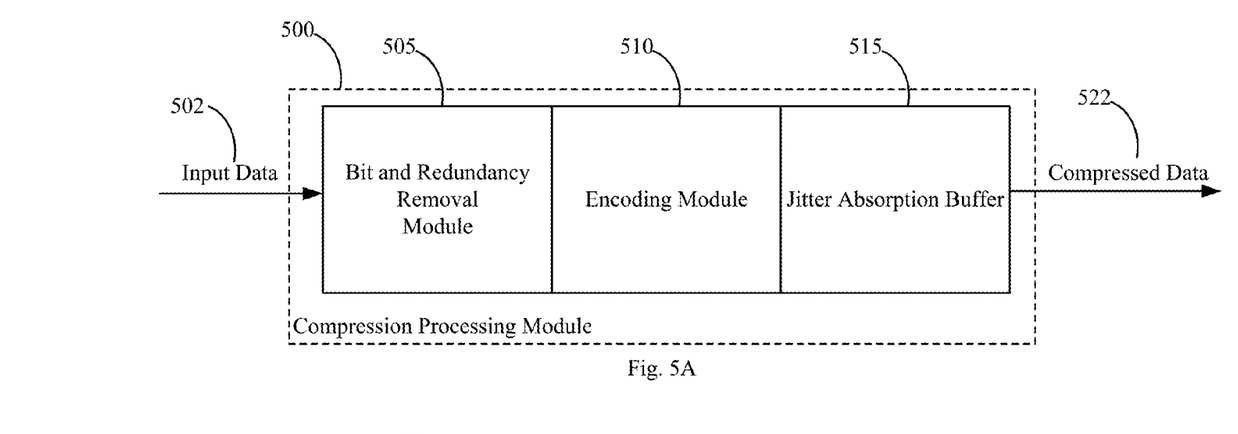
FIG. 5A is a block diagram illustrating a compression processing module in accordance with an embodiment of the present invention.

With reference to FIG. 5A, in performing real-time compression, compressors 425, 445 of FIG. 4 may comprise several stages of compression within a compression processing module 500. In the present embodiment, compression processing module 500 includes a bit and redundancy removal module 505, an encoding module 510 and a jitter absorption buffer 515. Encoding module 510 is coupled to bit and redundancy removal module 505 and to jitter absorption buffer 515. In operation, input data 502 may be received at the compression processing module 500 of the compressor. The bit and redundancy removal module 505 processes the input data 502 to increase the entropy of the data by removing redundant and unnecessary bits from the input data 502. Additionally, the bit and redundancy removal module 505 may degrade the input data 502 to achieve the compression target. The encoding module 510 applies one of many encoding methods known in the art to compress input data 502. The jitter absorption buffer 515 is operable to absorb the propagation delay variation in the data prior to transmitting the compressed data 522 from the compression processing module 500.

Figure 5B:
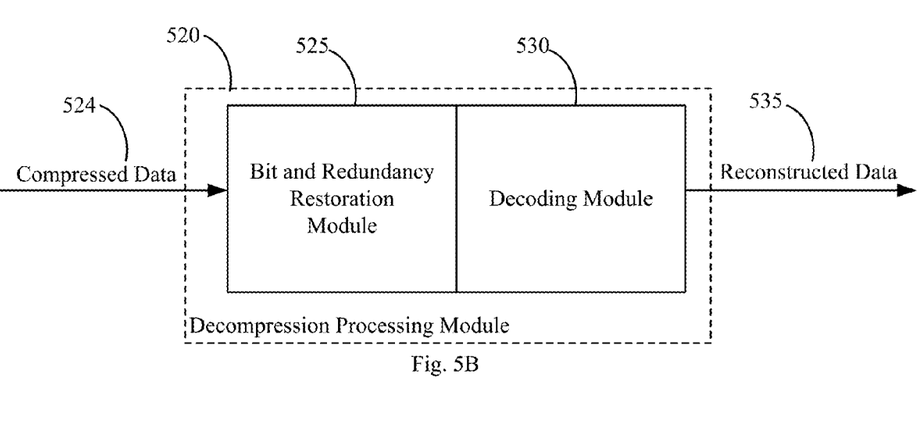
FIG. 5B is a block diagram illustrating a decompression processing module in accordance with an embodiment of the present invention.

After transmission, the compressed data 522 may be received at a decompression processing module 520. In one embodiment a decompression processing module 520 is located in each of decompressors 430 and 450 for decompressing compressed data 522. The decompression processing module 520 may comprise a bit and redundancy restoration module 525 and a decoding module 530 that are coupled together. The bit and redundancy restoration module 525 may be used to restore the bits previously removed from the data during the compression process. The decoding module 530 may decode compressed data that was previously encoded by the encoding module 510 of the compression processing module 500. After the compressed data is restored and decoded, the reconstructed data 535 may be transmitted from the decompression processing module.

In accordance with the present invention, a data packet received at the compressor is divided into a plurality of segments and at least one packet segment compression parameter is estimated for each of the segments in the data packet. The packet segment compression parameters are then used to compress and decompress the data packet. Utilizing compression parameters that are specific to an individual segment of the data packet provides near optimal compression performance characterized by minimum degradation to the data and an acceptable peak compression jitter.

Figure 6:
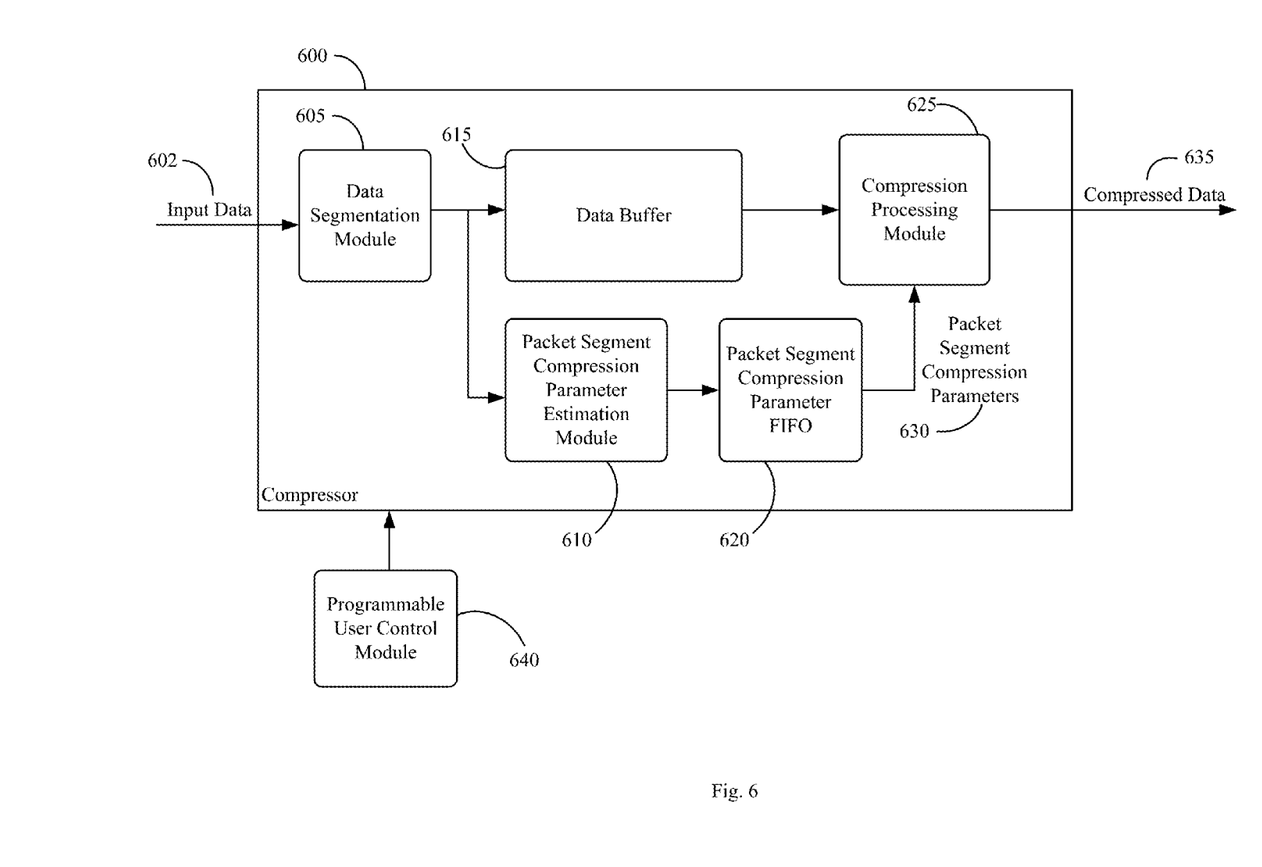
FIG. 6 is a block diagram illustrating a compressor in accordance with an embodiment of the present invention.

With reference to FIG. 6, the compressor 600 in accordance with the present invention provides a look-ahead decision algorithm that estimates, in real-time, the compression parameters for individual segments of the data packet to be compressed. The compressor 600 of the present invention is capable of generating compressed data from both single stream and multiple stream input data. Single stream input data is representative of data received from one of a plurality of component carriers, whereas multiple stream input data comprises a plurality of signal streams, as is the case in communication systems employing carrier aggregation. In the present invention, multiple streams of data, each stream associated with one of a plurality of component carriers may be received, and compressed, by the compressor. In the present invention, each of the signal streams may be associated with a different wireless protocol, including, but not limited to CDMA (Code Division Multiple Access) and LTE (Long Term Evolution).

In operation, the input data to be compressed 602 is received at the data segmentation module 605. The input data may be a data packet comprising a plurality of signal samples. The input data may be comprised of a single stream or multiple streams. The data segmentation module 605 segments the received data packet into a plurality of packet segments. The packet segments may be the same size, thereby comprising the same number of signal samples. Alternately, the packet segments may be variable in size, such that one packet segment contains more signal samples than another packet segment. The size of the packet segment may be user programmable or alternatively, the packet segment size may be determined by the protocol of the input data. In one embodiment data segmentation module 605 analyzes the input data and determines the protocol of the input data.

In one embodiment, the data segmentation module 605 includes circuitry for measuring the energy variation of the input data 602. By measuring the energy variation, or entropy, in the input data 602, the data segmentation module 605 can adjust the size of the packet segments to improve the compression performance. For example, if the energy variation of the input data 602 is low, indicating that the energy of the input data 602 is relatively constant, then it would be appropriate to use the same level of attenuation over a large number of signal samples of the input data 602 and the data segmentation module 605 will generate longer packet segments from the input data 602. The attenuation of the signal samples of the packet segment can be performed by the bit and redundancy removal module 505. In the alternative, if the energy variation of the input data 602 is high, indicating that the energy of the input data 602 exhibits a large amount of variation, then it would not be appropriate to use the same attenuation value over a large number of signal samples of the input data 602 and the data segmentation module will generate shorter packet segments from the input data 602. In general, the data segmentation module 605 may measure the energy variation of the input data 602 and segment the data according to the energy variation of the input data 602 to improve the compression performance, wherein high energy input data 602 is divided into short packet segments and low energy input data 602 is divided input long packet segments. Since each of the packet segments requires a header, the compression performance is improved by utilizing larger packet segments, thereby requiring fewer packet headers and reducing the amount of data that needs to be compressed. The determination as to what constitutes a short packet segment and a long packet segment, and what energy level constitutes a low energy level and a high energy level, may be determined by a user of the compression system.

After the data segmentation module 605 has segmented the packet into packet segments, the data buffer 615 stores the packet segments, along with the segment alignments, for each packet. The packet segment compression parameter estimation module 610 then analyzes the characteristics of each of the packet segments and calculates packet segment compression parameters for each of the packet segments. The calculated packet segment compression parameters are estimated based upon realizing a desired target compression ratio. The calculated packet segment compression parameters may include, but are not limited to, the level of signal degradation for the packet segment, the redundancy method to be used for the packet segment and the encoding scheme to be employed in the compression of the packet segment.

After the packet segment compression parameters have been estimated, they may be stored in a packet segment compression parameter FIFO 620. The packet segment compression parameter FIFO 620 may store more than one set of packet segment parameters when the data buffer 615 stores more than one packet segment. The packet segments and their associated packet segment compression parameters are then transmitted from the data buffer 615 and the packet segment compression parameter FIFO 620 to the compression processing module 625.

The compression processing module 625 is operable to compress the packet segments utilizing the estimated compression parameters for each of the packet segments to generate a compressed data packet 635. As previously described, with reference to FIG. 5A, the compression processing module 625 may include a bit and redundancy removal module 505, an encoding module 510 and a jitter absorption buffer 515. After the compression processing module 625 has compressed the packet segments as described, the packet segment parameters used for the compression are embedded within the compressed data packet 635. The compressed data packet 635 may then be transmitted from the compressor 600 along a communication link.

The compressor 600 of the present invention may additionally include a programmable user control module 640 to provide optimization of the segment parameter estimation. The programmable user control module 640 provides specific parameters to the compressor for input data having known characteristics.

The data segmentation module 605 continues to measure the energy variation of the input data 602 and may adjust the size of the data segments based upon the energy variation measurements. The data segmentation module 605 may be configured to measure the energy of each data packet of the input data 602 or to measure the energy of a data packet of the input data 602 based upon a predetermined measurement schedule as may be provided by the user of the compression system.

Figure 7:
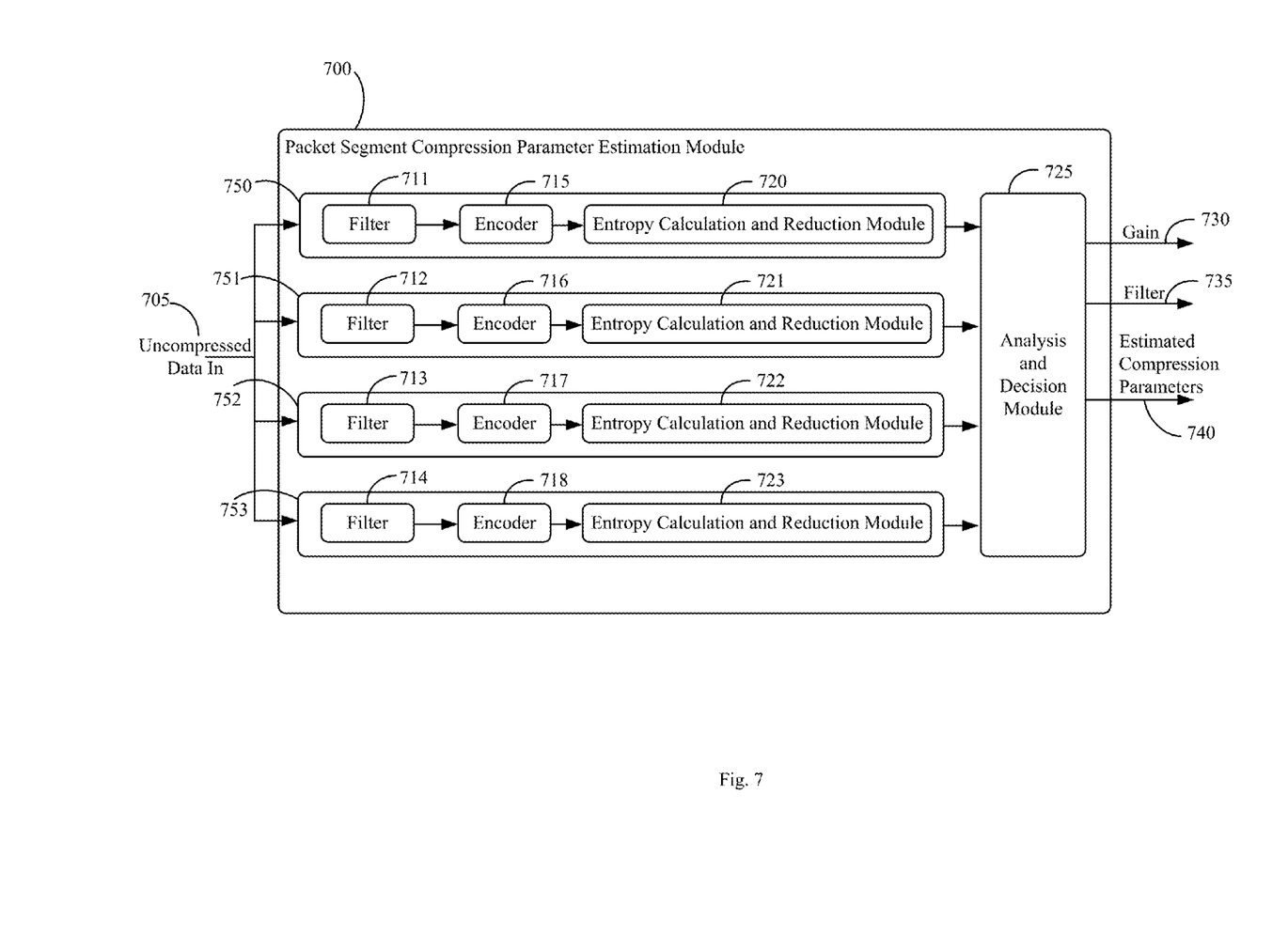
FIG. 7 is a block diagram illustrating a packet segment compression parameter estimation module in accordance with an embodiment of the present invention.

With reference to FIG. 7, in accordance with an embodiment of the present invention the packet segment compression parameter estimation module 700 of the compressor includes a plurality of compression parameter estimation paths 750, 751, 752, 753. Is this specific embodiment, four compression parameter estimation paths are illustrated, however this is not meant to be limiting and greater or fewer estimation paths may be included in the compression parameter estimation module 700 of the present invention.

Each of the compression parameter estimation paths 750, 751, 752, 753 may be associated with an nth-order derivative and as such, each of the compression parameter estimation paths may comprise one of a plurality of filters 711, 712, 713, 714. Each of the plurality of filters 711, 712, 713, 714 may be designed to filter the uncompressed data 705 in accordance with the associated nth-order derivative. After the uncompressed data 705 is received at the compression parameter estimation module 700, the uncompressed data 705 is filtered by each of the plurality of filters 711, 712, 713, 714 in parallel. The output of the each of the plurality of filters 711, 712, 713, 714 is a plurality of filtered uncompressed data signals, each of the resulting filtered uncompressed data signals having a unique filter parameter determinant upon which of the plurality of filters 711, 712, 713, 714 filtered the uncompressed data 705. The plurality of filtered uncompressed data signals from the each of the plurality of filters 711, 712, 713, 714 is then provided to one of a plurality of encoders 715, 716, 717, 718. Each of the plurality of encoders 715, 716, 717, 718 operable to encode the filtered uncompressed data from each of the plurality of filters 711, 712, 713, 714 utilizing one of a plurality of encoding techniques currently known in the art. The filtered and encoded data from each of the plurality of encoders 715, 716, 717, 718 is then provided to one of a plurality of entropy calculation and reduction modules 720, 721, 722, 723. Each of the plurality of entropy calculation and reduction modules 720, 721, 722, 723 is operable to calculate the entropy of the filtered and encoded data and to reduce the entropy of the data as necessary utilizing one of a plurality of entropy calculation and reduction techniques currently known in the art.

In operation, the uncompressed data 705 is received at the compression parameter estimation module 700 and is processed by each of the plurality of parameter estimation paths 750, 751, 752, 753 in parallel. The resulting data from each of the plurality of parameter estimation paths 750, 751, 752, 753 is then be provided to the analysis and decision module 725. The analysis and decision module 725 evaluates the jitter and achieved compression ratio associated with each of the plurality of parameter estimation paths 750, 751, 752, 753. Based upon the evaluation, the analysis and decision module 725 selects which of the plurality of parameter estimation paths 750, 751, 752, 753 provided the data that most closely meets the desired compression result. As such, the analysis and decision module 725 identifies the combination of filter, encoder, entropy calculation and reduction that most closely meets the desired compression result. In a particular embodiment, the analysis and decision module 725 may determine that the compression parameter estimation path that meets the desired compression result is the compression parameter estimation path that produces the least jitter and the greatest compression ratio. The analysis and decision module 725 then provides the compression parameters associated with the selected filtering, encoding and entropy calculation and reduction to the packet segment compression parameter FIFO 620 as previously described with reference to FIG. 6. The compression parameters may include a signal gain parameter 730, a filter parameter 735, and a plurality of other estimated compression parameters 740 identifying the selected combination of filter, encoder and entropy calculation and reduction providing the desired compression result. The packet segment compression parameter FIFO 620 provides the packet segment compression parameters to the compression processing module 625.

In one embodiment one or more of encoders 715, 716, 717, 718 apply different encoding techniques to the filtered uncompressed data signals. For example, some of encoders 715, 716, 717, 718 may apply one type of encoding algorithm while others may apply a different type of encoding algorithm. Encoders 715, 716, 717, 718 may apply Huffman encoding, block floating point (BFP) encoding, or other encoding techniques. Alternatively, one or more of encoders 715, 716, 717, 718 apply the same encoding algorithm utilizing different variables. For example, the number of samples in BFP encoding may be varied for one or more of the encoders 715, 716, 717, 718.

Entropy calculation and reduction modules 720, 721, 722, 723 apply various entropy calculation and reduction techniques to the received filtered encoded uncompressed data signals. For example, some of entropy calculation and reduction modules 720, 721, 722, 723 may perform first-order entropy estimates to calculate the entropy of the filtered encoded uncompressed data signals and to reduce the redundancy in the data signals without introducing any degradation to the data signal. Additionally, varying the size of the packet segment changes the results of the entropy calculation and reduction module 720, 721, 722, 723 because the entropy is partially dependent upon the number of signal samples in the packet segment.

Figure 8:
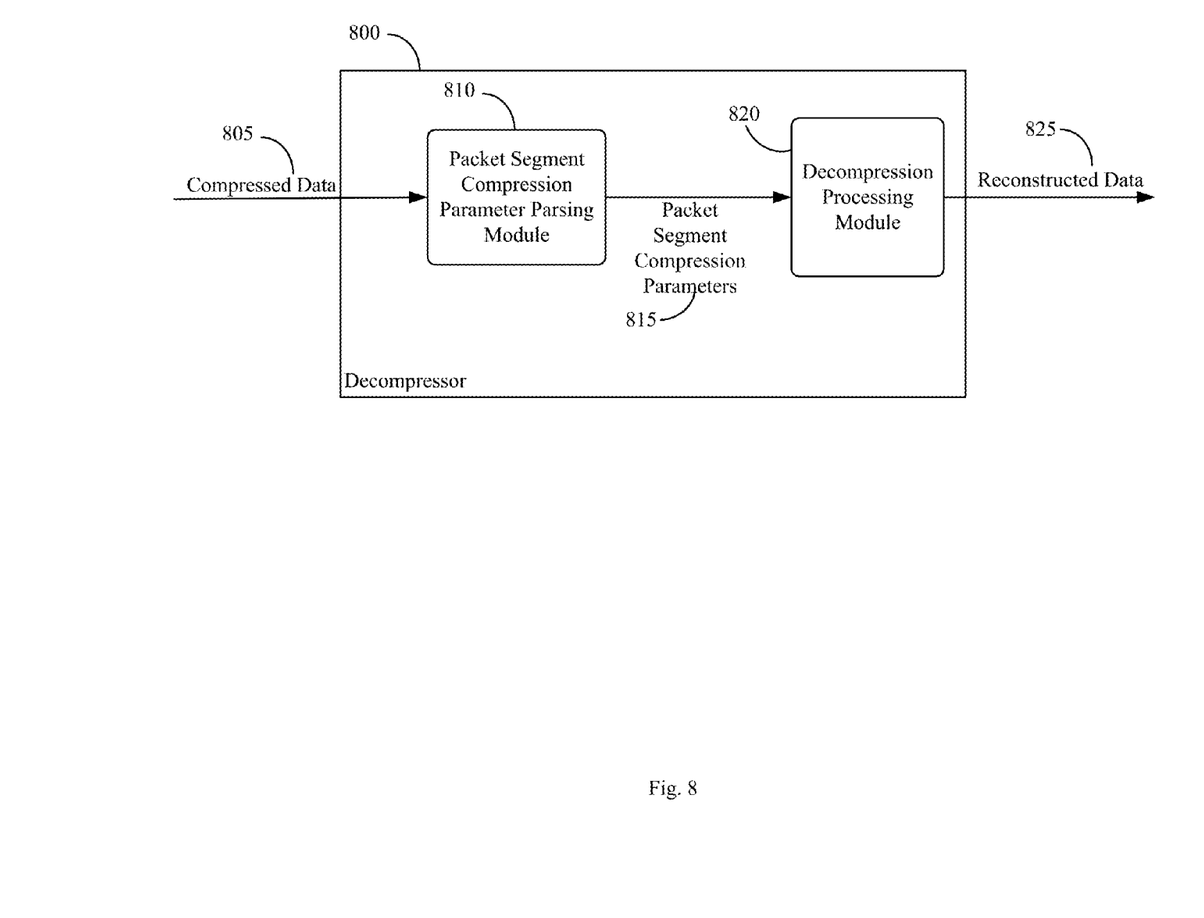
FIG. 8 is a block diagram illustrating a decompressor in accordance with an embodiment of the present invention.

With reference to FIG. 8, compressed data 805 originating from a compressor is received at a decompressor 800. The decompressor includes a packet segment compression parameter parsing module 810 for receiving the compressed data packet 805 and extracting the packet segment compression parameters 815 from the compressed data packet 805. The packet segment compression parameters 815 are then used to restore and reconstruct the original data 825 that was previously compressed by the compressor. The decompressor 800 may utilize a decompression processing module 820 to restore and reconstruct the data 825. As previously described, with reference to FIG. 5B, the decompression processing module may include a bit and redundancy restoration module 525 and a decoding module 530.

Figure 9:
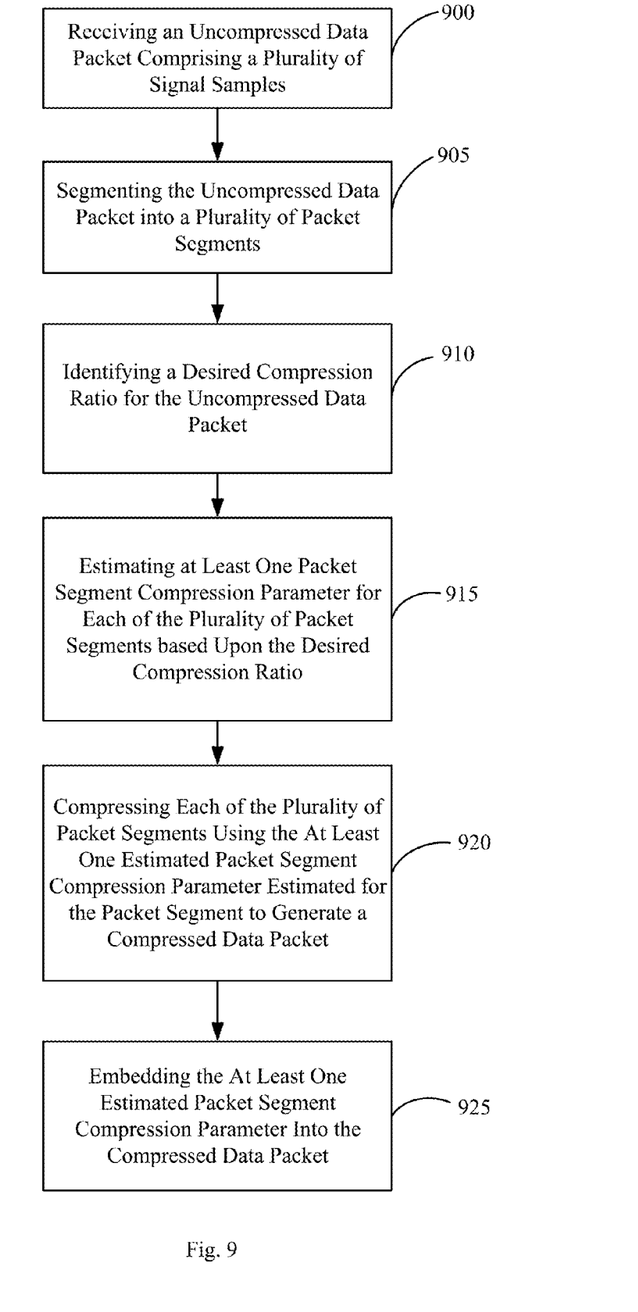
FIG. 9 is a flow diagram illustrating an embodiment of the present invention.

With reference to FIG. 6 and FIG. 9, a method of data compression is shown that includes receiving an uncompressed data packet comprising a plurality of signal samples In one embodiment the uncompressed data packet is received at compressor 600 that may be located at a baseband unit or at one or more remote radio units as previously described. The uncompressed data packet is segmented into a plurality of packet segments 905. In one embodiment, the segmentation module 605 of the compressor 600 is used to segment the data packet into a plurality of packet segments. A desired compression ratio is then identified for the uncompressed data packet 910. The desired compression ratio may be user defined. In one embodiment the desired compression ratio is provided by the user and stored in programmable user control module 640. The stored desired compression ratio may then be provided to the compressor 600. At least one packet segment compression parameter is estimated for each of the plurality of packet segments based upon the desired compression ratio 915. Packet segment compression parameter estimation module 700 may estimate the packet segment compression parameters, producing estimated gain 730, filter 735 and other estimated compression parameters 740. The plurality of packet segments are then compressed using the at least one estimated packet segment compression parameter estimated for the packet segment to generate a compressed data packet 920. In one embodiment, packet segment compression parameter estimation module 610 may provide the at least one estimated packet segment compression parameter to the compression processing module 625 and the compression processing module 625 may compress the plurality of packet segments using the at least one estimated packet segment compression parameter to generate the compressed data packet. The at least one estimated packet segment compression parameter is then embedded into the compressed data packet 925 to enable decompression of the compressed packet. In one embodiment, the compression processing module 625 may embed the at least one estimated packet segment compression parameter into the compressed data packet.

As additional input data is received at the compressor, the compressor may continue to segment the input data received at the compressor into a plurality of packet segments and continue to estimate packet segment compression parameters to generate compressed data packets.

The compressor of the present invention may be used in the generation of compressed data packets for transmission within a communication system. In the present invention, the packet is segmented into packet segments and estimated packet segment compression parameters are identified for the various packet segments to achieve a desired compression ratio. As such, the generation of a compressed data packet is adaptively adjusted based upon the current signal characteristics of the packet segments identified at the compressor. The compressor of the present invention estimates packet segment compression parameters for each packet segment of a data packet and the estimated packet segment compression parameters may be different for different packet segments. By compressing the packet segments using the estimated packet segment compression parameters that are specific to each of the packet segments, a greater compression ratio can be achieved and latency jitter can be minimized. Additionally, the number of signal samples in the packet segment may be varied, thereby effecting the entropy calculation and entropy reduction that can be achieved by the compressor.

As is known in the art, the compressor may be implemented in a Field Programmable Gate Array (FPGA), an Application-Specific Integrated Circuit (ASIC) or a variety of other commonly known integrated circuit devices. The implementation of the invention may include both hardware and software components.

The invention claimed is:

1. A method for data compression in a communication system, the method comprising:
receiving an uncompressed data packet at a compressor of a communication system, the uncompressed data packet comprising a plurality of signal samples;
identifying a desired compression ratio for the uncompressed data packet;
measuring the energy variation of the uncompressed data packet;
segmenting the uncompressed data packet into a plurality of packet segments based on the measured energy variation, wherein each of the plurality of packet segments comprises one or more signal samples and wherein packet segments having a lower measured energy variation have more signal samples than packet segments having a higher measured energy variation;
estimating at least one packet segment compression parameter for each of the plurality of packet segments based upon the desired compression ratio;
compressing each of the plurality of packet segments using the at least one estimated packet segment compression parameter for the packet segment to generate a compressed packet; and
embedding the at least one estimated packet segment compression parameter into the compressed packet.

2. The method of claim 1, wherein identifying a desired compression ratio for the uncompressed data packet further comprises, receiving input from a user identifying the desired compression ratio.

3. The method of claim 1, wherein the number of signal samples in each of the plurality of packet segments is not equal.

4. The method of claim 1, wherein estimating at least one packet segment compression parameter for each of the plurality of packet segments further comprises:
processing each of the plurality of packet segments through a plurality of compression parameter estimation paths operating in parallel; and
identifying the compression parameter estimation path of the plurality of compression parameter estimation paths that most closely meets a desired compression result to estimate the least one packet segment compression parameter for each of the plurality of packet segments.

5. The method of claim 1, wherein estimating at least one packet segment compression parameter for each of the plurality of packet segments further comprises, receiving known characteristics of the signal samples from a programmable user control module to be used in the estimation of the packet segment compression parameters.

6. The method of claim 1, wherein the at least one estimated packet segment compression parameter is selected from the group consisting of a level of data degradation, a redundancy method and an encoding value scheme.

7. The method of claim 1, further comprising storing the plurality of packet segments and an associated segment alignment in a data buffer prior to compressing the plurality of packet segments.

8. The method of claim 1, further comprising storing the at least one estimated packet segment compression parameter in a buffer prior to compressing the packet segments.

9. The method of claim 1, further comprising transmitting the compressed packet to a decompressor and receiving the compressed packet at the decompressor, parsing the compressed packet to recover the estimated packet segment compression parameters and reconstructing the uncompressed packet.

10. A compressor configured to compress data in a communication system, the compressor comprising:
a data segmentation module configured to receive an uncompressed packet, to measure the energy variation of the uncompressed packet, to segment the uncompressed packet into a plurality of packet segments, wherein each of the plurality of packet segments comprises one or more signal samples and wherein packet segments having a lower measured energy variation have more signal samples than packet segments having a higher measured energy variation;
a packet segment compression parameter estimation module coupled to the data segmentation module, the packet segment compression parameter estimation module configured to receive the plurality of packet segments and configured to estimate at least one packet segment compression parameter for each of the plurality of packet segments based upon a desired compression ratio; and
a compression processing module coupled to the packet segment compression parameter estimation module, the compression processing module configured to compress each of the plurality of packet segments using the at least one estimated packet segment compression parameter estimated for the packet segment to generate a compressed packet and configured to embed the at least one estimated packet segment compression parameter into the compressed packet.

11. The compressor of claim 10, wherein the packet segment compression parameter estimation module further comprises a plurality of compression parameter estimation paths operating in parallel on the plurality of packet segments; and
an analysis and decision module coupled to each of the plurality of compression parameter estimation paths, the analysis and decision module configured to identify the compression parameter estimation path of the plurality of compression parameter estimation paths that most closely meets a desired compression result to estimate the at least one packet segment compression parameter.

12. The compressor of claim 10, further comprising a data buffer coupled to the data segmentation module, the data buffer configured to store the plurality of packet segments and an associated segment alignment for each of the plurality of packet segments.

13. The compressor of claim 10, further comprising a packet segment compression parameter FIFO coupled to the packet segment compression parameter estimation module, the packet segment compression parameter FIFO configured to store the at least one packet segment compression parameter.

14. The compressor of claim 10, wherein the compression processing module further comprises a bit redundancy removal module, an encoding module and a jitter absorption buffer.

15. The compressor of claim 10, wherein the compression processing module of further comprises, a programmable user control module coupled to the packet segment compression parameter estimation module, the programmable user control module to provide known characteristics of the signal samples to the packet segment compression parameter estimation module to be used in the estimation of the packet segment compression parameters.

16. The compressor of claim 10, wherein the number of signal samples in each of the plurality of packet segments is not equal.

17. A compression system configured to compress and decompress data in a communication system, the compressor comprising:
a data segmentation module configured to receive an uncompressed packet, to measure the energy variation of the uncompressed packet, to segment the uncompressed packet into a plurality of packet segments, wherein each of the plurality of packet segments comprises one or more signal samples and wherein packet segments having a lower measured energy variation have more signal samples than packet segments having a higher measured energy variation;
a packet segment compression parameter estimation module coupled to the data segmentation module, the packet segment compression parameter estimation module configured to receive the plurality of packet segments and configured to estimate at least one packet segment compression parameter for each of the plurality of packet segments based upon a desired compression ratio;
a compression processing module coupled to the packet segment compression parameter estimation module, the compression processing module configured to compress each of the plurality of packet segments using the at least one estimated packet segment compression parameter estimated for the packet segment to generate a compressed packet and configured to embed the at least one estimated packet segment compression parameter into the compressed packet;
a packet segmentation compression parameter parsing module coupled to the compression processing module, the packet segmentation compression parameter parsing module to recover the packet segment compression parameters from the compressed packet; and
a decompression processing module coupled to the packet segmentation compression parameter parsing module, the decompression processing module to reconstruct the uncompressed packet.

* * * * *